United States Patent

Jasper

[11] Patent Number: 5,312,096
[45] Date of Patent: May 17, 1994

[54] WELDING JIG FOR PIPES

[76] Inventor: Thomas E. Jasper, 4719 Peachridge, N.W., Grand Rapids, Mich. 49504

[21] Appl. No.: 28,352

[22] Filed: Mar. 9, 1993

[51] Int. Cl.$^5$ .................................................. B25B 1/20
[52] U.S. Cl. ........................................ 269/43; 269/70; 269/296; 269/279; 269/902
[58] Field of Search .................. 269/43, 69, 70, 296, 269/279, 37, 902; 228/49.3, 44.5

[56] References Cited

U.S. PATENT DOCUMENTS

| | | |
|---|---|---|
| 356,937 | 2/1887 | Harding . |
| 568,543 | 9/1896 | Parks . |
| 581,079 | 4/1897 | McHugh . |
| 876,228 | 1/1908 | Pereles ............................... 269/283 |
| 890,063 | 6/1980 | Jones .................................. 269/283 |
| 1,208,522 | 12/1916 | Duncan . |
| 1,307,379 | 6/1919 | Segal . |
| 1,313,061 | 8/1919 | Brown . |
| 1,318,057 | 10/1919 | Dean .................................. 269/279 |
| 1,531,377 | 3/1925 | Clarke . |
| 2,102,259 | 12/1937 | Edwards et al. . |
| 2,462,121 | 2/1949 | Muhlack . |
| 2,495,438 | 1/1950 | Bentley et al. ....................... 269/70 |
| 2,524,168 | 10/1950 | Harnish, jr. et al. . |
| 2,524,969 | 10/1950 | Fairchild . |
| 2,682,244 | 6/1951 | Fortner . |
| 2,699,601 | 1/1955 | Darnell . |
| 2,700,949 | 2/1955 | Kunzi . |
| 2,730,796 | 1/1956 | Menser . |
| 2,853,771 | 9/1958 | Melville .............................. 269/296 |
| 2,854,941 | 10/1958 | Vollmer . |
| 2,883,184 | 4/1959 | Brewington . |
| 2,887,079 | 5/1959 | Wilson . |
| 2,928,364 | 3/1960 | Davis . |
| 3,089,950 | 5/1963 | Elchyshyn . |
| 3,186,704 | 6/1965 | McCloskey et al. . |
| 3,239,209 | 3/1966 | Kucka . |
| 3,245,201 | 4/1966 | Richardson . |
| 3,408,729 | 11/1968 | Gersbacher . |
| 3,566,507 | 3/1971 | Jacobsen . |
| 3,772,753 | 11/1973 | Sargeant . |
| 3,827,126 | 8/1974 | Shiozawa et al. . |
| 3,881,715 | 5/1975 | Creek . |
| 4,209,166 | 6/1980 | DeRouen . |
| 4,240,621 | 12/1980 | Daddato ............................. 269/279 |
| 4,579,322 | 4/1986 | Schwarz ............................. 269/296 |
| 5,040,716 | 8/1991 | Stetz . |

FOREIGN PATENT DOCUMENTS

| | | | |
|---|---|---|---|
| 1017737 | 12/1952 | France ................................. 269/296 |
| 689941 | 4/1951 | United Kingdom ................ 269/296 |

OTHER PUBLICATIONS

Exhibit A discloses various known pipe stands adapted and used for supporting a pipe, the pipe stands being marketed by Ridgid Company, address unknown.

Primary Examiner—Robert C. Watson
Attorney, Agent, or Firm—Price, Heneveld, Cooper, DeWitt & Litton

[57] ABSTRACT

The present invention includes a welding jig having a first support plate and a second support plate rotatably connected to the first support plate. The second support plate has a template-shaped perimeter including arcuately shaped segments shaped to support pipe fittings of different sizes. By selectively positioning a particular segment and securing locking the particular segment in place, a particular pipe fitting such as a particular 90° pipe elbow can be supported with one end resting on the selected particular segment and the other end resting on the first support plate. By this arrangement, particular pipe fitting can be supported in a predetermined and square position relative to a pipe, thus facilitating welding the particular pipe elbow to the pipe. This allows substantially a one-person welding operation.

21 Claims, 2 Drawing Sheets

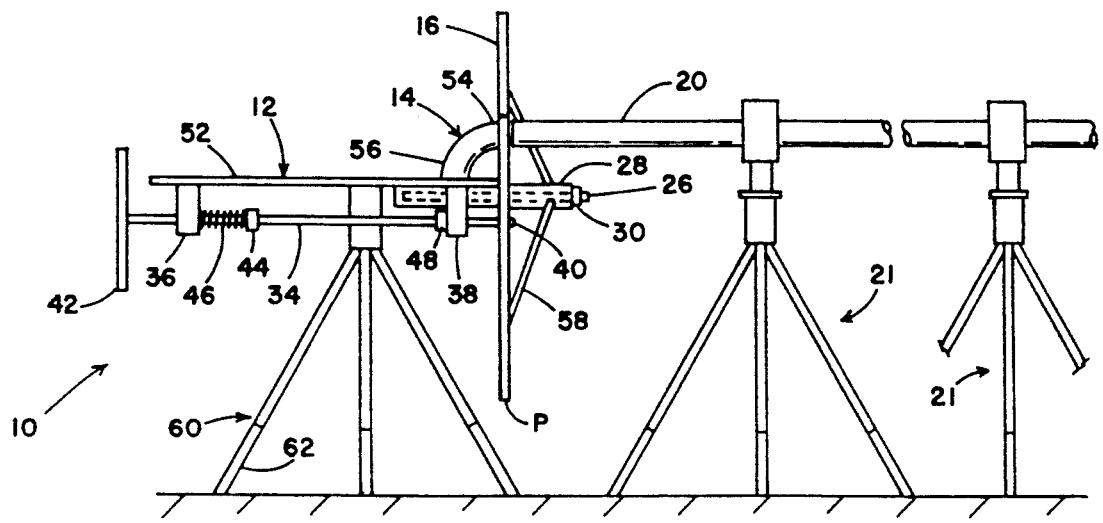
FIG. 1
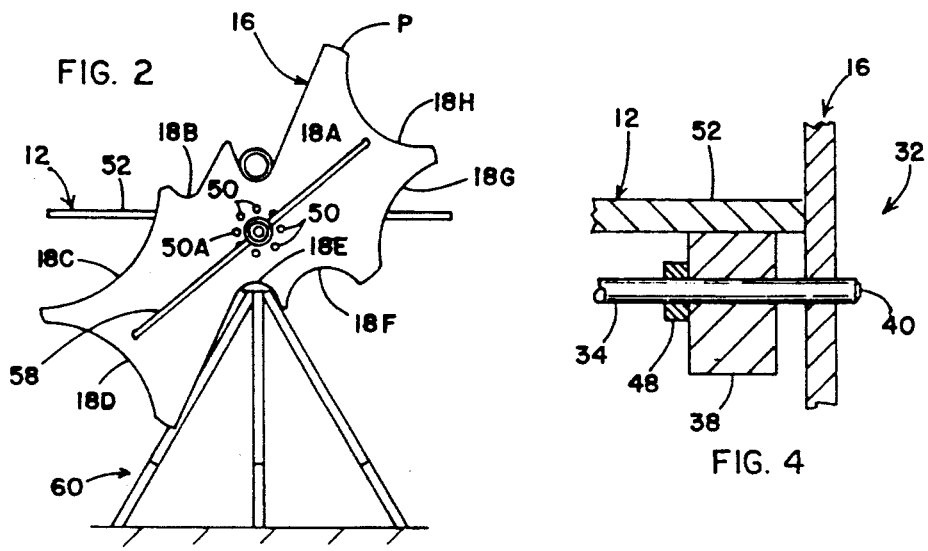
FIG. 2
FIG. 4
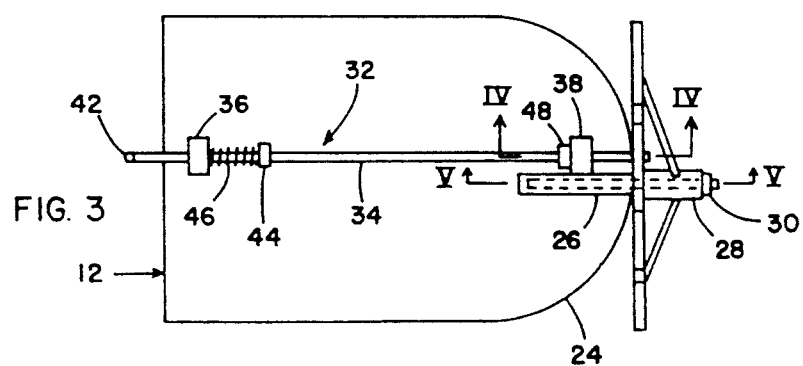
FIG. 3

WELDING JIG FOR PIPES

BACKGROUND OF THE INVENTION

The present invention relates to welding jigs, and in particular, to a welding jig for holding a pipe fitting in a predetermined spacial relation to a pipe to facilitate setup and also welding of the pipe fitting to the pipe by a single operator.

The construction industry is extremely competitive, and it is vital that a minimum of manpower be used while still assuring that quality is maintained. One area where a helper has typically been required is when welding large pipe sections together to form a custom pipe arrangement. These custom pipe arrangements are usually welded on-site to minimize the need for detailed blueprints/dimensions and also since the on-site welding eliminates shipping problems. The helper is used along with various jerry-built holders to hold the pipe fitting square while it is initially tacked in place and then fully welded to a pipe section with a leakproof weld seam. This is more difficult than it initially appears since the pipe fitting can be heavy, and also since the pipe fitting must be held slightly away from the end of the pipe section so that the weld will penetrate to the desired depth. Not only is it difficult to see whether the pipe fitting is uniformly spaced from the pipe end, but on-site conditions such as poor lighting, awkward positions, and the like complicate the welding process.

Several jigs have been developed to assist in aligning and holding a pipe fitting relative to a pipe section. However, many of these are more complicated and expensive than is desired. Further, known welding jigs are often cumbersome to use, and are not as durable and long lasting as is desired.

Thus, a welding jig solving the aforementioned problems is desired

SUMMARY OF THE INVENTION

The present invention includes a welding jig having a first support plate and a second support plate rotatably connected to the first support plate. The second support plate has a template-shaped perimeter including segments shaped to support pipe fittings of different diameters. By rotating the second support plate to selectively position a particular segment, a particular pipe fitting of selected size can be supported with one end resting on the particular segment and the other end resting on the first support plate. By this arrangement, the particular pipe fitting can be supported in a predetermined and square position relative to a pipe, thus facilitating welding the particular pipe fitting to the pipe. This facilitates an efficient and simple welding operation, which can be a one-person operation if desired.

These and other features, objects, and advantages will become apparent to persons skilled in the art by reference to the specification, claims, and appended drawings.

BRIEF DESCRIPTION OF THE DRAWINGS

FIG. 1 is a side view of a welding jig embodying the present invention with a 90° pipe elbow being illustrated as resting on and being held in alignment with a pipe section;

FIG. 2 is an end view of the welding jig as seen from the end facing the pipe section;

FIG. 3 is a bottom plan view of the welding jig with the tripod removed for clarity;

FIG. 4 is a cross section taken along the plane IV—IV in FIG. 3;

DETAILED DESCRIPTION OF THE PREFERRED EMBODIMENTS

Figure 5:
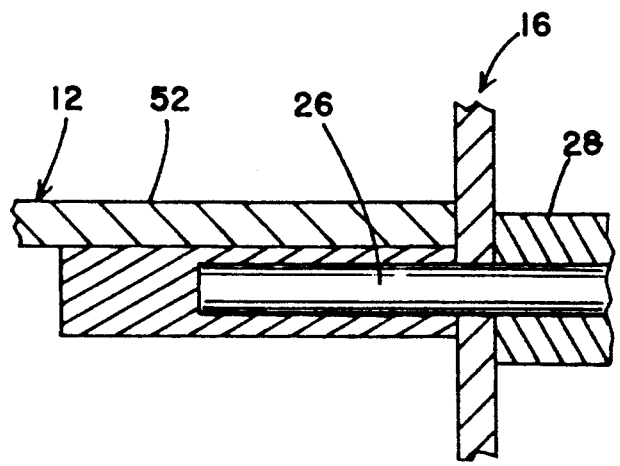
FIG. 5 is a cross section taken along the plane V—V in FIG. 3.

A welding jig 10 (FIG. 1) embodying the present invention includes a first stationary support plate 12 for supporting one end of a pipe fitting, such as the illustrated 90° pipe elbow 14, and a second movable support plate 16 rotatably mounted to first support plate 12 for supporting the other end of the pipe fitting. Second support plate 16 includes a perimeter "P" having multiple arcuate segments 18A–18H adapted to support pipe fittings of different sizes so that by selectively positioning second support plate 16, a particular pipe fitting of selected size can be aligned by a single person and held in the aligned position for welding to a pipe such as pipe 20.

Welding jig 10 is particularly useful as a fixture for holding top-heavy or otherwise unbalanced pipe fittings such as pipe elbows, pipe tees, pipe "Y"s and other such fittings in a predetermined orientation relative to another pipe section for welding to the pipe section. For example, welding jig 10 allows efficient and easy setup by a single individual. Further, the welding jig 10 securely holds the selected pipe fitting so that it can be spaced slightly away from the pipe section in the predetermined orientation, which spacing is important so that the weld properly penetrates the interface to form a secure and leakproof weld seam.

More particularly, first support plate 12 (FIGS. 1 and 3) is planar in shape with a rounded front edge 24. A rod-like axle 26 is secured under support plate 12 and protrudes outwardly from front edge 24. Second support plate 16 is also planar in shape. Second support plate 16 is oriented perpendicularly to first support plate 16, and is located proximate first edge 24. Second support plate 16 includes a bearing 28 for operably receiving axle 26. A stop 30 on the end of axle 26 retains second support plate 16 on axle 26.

A locking or positioning mechanism 32 (FIGS. 3 and 4) is secured under first support plate 12. Locking mechanism 32 includes a rod 34 slideably mounted on blocks 36 and 38 to the bottom surface of first support plate 12. Rod 34 includes a tip 40 that extends beyond front edge 24, and also includes a handle 42 located at the other end of rod 34 opposite tip 40. A stop 44 is secured to rod 34 proximate but spaced from block 36. A coil spring 46 is located on rod 34 between block 36 and stop 44 so that coil spring 46 biases rod 34 toward front edge 24, but so that rod 34 can be moved to retract tip 40 behind front edge 24 below first support plate 12. A second stop 48 is secured proximate block 38. Stop 48 abuttingly engages block 38 to limit the extension of rod 34 by spring 36 once rod tip 40 extends beyond front edge 24 a predetermined distance.

Second support plate 16 includes a series of holes or apertures 50 located around bearing 28 and axle 26 (FIG. 2). Holes 50 correspond to arcuate segments 18A–18H and are located so that rod tip 40 can be selectively placed therein to hold second support plate 16 in a selected position. For example, with tip 40 located in hole 50A, arcuate segment 18A is positioned for use.

Arcuate segments 18A-18H are located a predetermined distance from axle 26 so that when selected, arcuate segments 18A-18H are located at a desired height with respect to the top surface 52 of first support plate 12. This allows the respective selected segment 18A-18H to support a first end 54 of a selected pipe elbow 14 while the second end 56 of the pipe elbow rests flat on upper surface 52 of first support plate 12.

It has been found that it is desirable to locate arcuate segments 18A-18H in a pattern so that second support plate 16 has a center of gravity that is relatively close to axle 26. This prevents second support plate 16 from accidentally rotating when rod 34 is moved to release second support plate 16 for rotation to a new position. Also, a handle and support 58 is attached to the face of second support plate 16 to strengthen and facilitate controllably rotating second support plate 16.

A tripod 60 is secured to the bottom of first support plate 12. Tripod 60 can be any of a variety of different tripods known in the industry It is contemplated that tripod 60 will be attached to first support plate 12 near a center of gravity for welding jig 10 for maximum stability. It is also contemplated that legs 62 of tripod 60 will be vertically adjustable so that first support plate 12 can be easily leveled even on a non-uniform floor surface 64. This facilitates aligning pipe elbow 14 with pipe 20, which pipe 20 is supported with tripods 21. Other items can also be added to facilitate use of welding jig 10 such as wheels (not shown) for mobility, side handles (not shown) on first support plate 12 for gripping and carrying jig 10, markings to indicate which arcuate segment 18A-18H is for each diameter pipe elbow, and other similar features. Further, it is contemplated that a sawhorse-like support or other support with legs can be used instead of tripod 60.

To use welding jig 10, jig 10 is initially positioned approximately where it will be used. Locking mechanism 32 is released by grasping rod 34 along its length or at handle 42, and by moving rod 34 against the biasing force of spring 46. As spring 46 is compressed between stop 44 and block 36, rod tip 40 disengages from the previously selected hole 50. Second support plate 16 can then be rotated so that a selected arcuate segment such as arcuate segment 18A is positioned generally vertically. Rod 34 is then released so that rod tip 40 engages a selected hole, such as hole 50A, thus securely holding second support plate 16 in the selected position.

A pipe fitting such as 90° pipe elbow 14 having a selected diameter/size is then positioned in jig 10 with one end 54 of the pipe elbow resting in the selected arcuate segment, such as arcuate segment 18A of second support plate 16, and the other end 56 of the pipe elbow resting flat and squarely on upper surface 52 of first support plate 12. Pipe elbow 14 is held in position by gravity The operator then aligns pipe elbow 14 with pipe 20 (or aligns pipe 20 with pipe elbow 14) by use of the adjustability in the tripod 60 (or tripods 21). Notably, pipe elbow 14 is securely supported a short distance of about ⅛ inch from pipe 20 so that the interconnecting weld when made will penetrate to the desired depth Also, pipe elbow 14 is positioned squarely with respect to pipe 20 both before (and during) welding. It is contemplated that pipe elbow 14 will be initially tack-welded in place, and then later welded completely about the perimeter of the fitting to form a watertight seal/bond, although welding jig 10 can accommodate various welding techniques.

Figure 6:
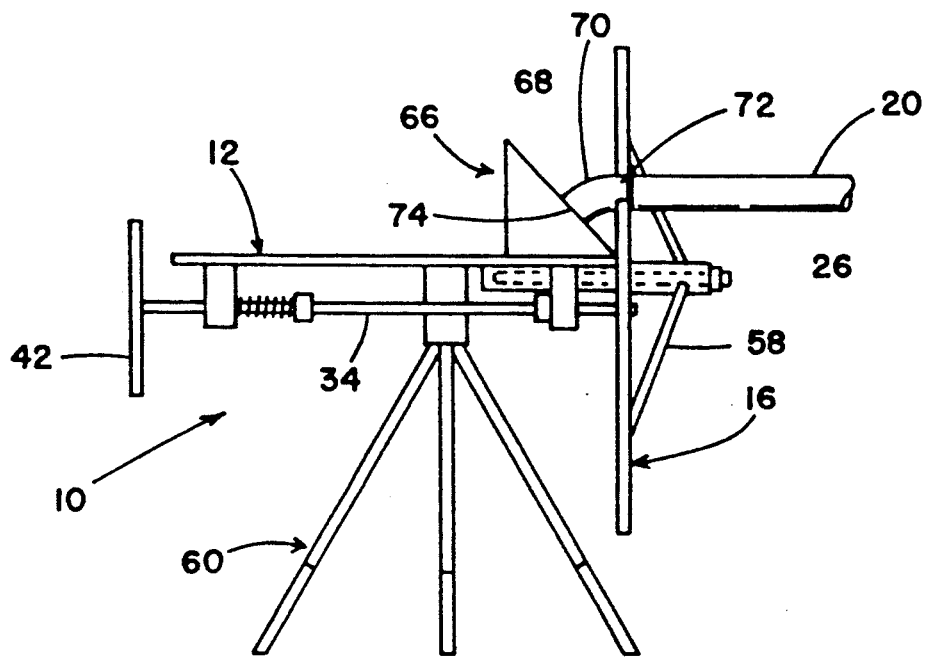
FIG. 6 is a side elevational view of the welding jig in FIG. 1 but also including a block with an angular surface for supporting a 45° pipe elbow.

A block 66 (FIG. 6) can be used on welding jig 10 to adapt jig 20 to support a 45° pipe elbow. As illustrated, block 66 is constructed to rest on the upper surface 52 of first support plate 12. Block 66 includes a 45° angled surface 68 which is positioned so that it extends from front edge 24 of first support plate 12 away from second support plate 16. By positioning block 66 on first support plate 12, a selected 45° pipe elbow 70 can be placed on jig 10 with one end 72 of elbow 20 resting on a selected arcuate segment 18A-18H and the other end 74 resting on the 45° angled surface 68 of block 66.

Thus a welding jig is provided which includes a first plate and a second plate rotatably secured to the first plate. The second plate includes a shaped perimeter adapted to support different sizes of pipe elbows. The welding jig is durable, easily setup, adapted for wide range of use, low cost and yet is comprised of few parts.

In the foregoing description, it will be readily appreciated by those skilled in the art that modifications may be made to the invention without departing from the concepts disclosed herein Such modifications are to be considered as included in the following claims, unless these claims by their language expressly state otherwise.

The embodiments of the invention in which an exclusive property or privilege is claimed are defined as follows:

1. A welding jig for welding large diameter pipe fittings and pipes together, comprising:
   a first support plate shaped to abuttingly support one end of a pipe fitting thereon, said first support plate including an edge;
   a second support plate rotatably connected to said first support plate, said second support plate being oriented perpendicularly to said first support plate and being located proximate said edge of said first support plate so that portions of said second support plate extend above and below said first plate so that portions of said second support plate extend above and below said first plate, said second support plate including a template-shaped perimeter including segments thereof shaped to support thereon one end of one of a plurality of differently sized pipe fittings, said second support plate being rotatable so that a selected one of said segments can be positioned to support one end of a particular pipe fitting with the other end of the particular pipe fitting resting on said first support plate, whereby the particular pipe fitting can be supported in a predetermined and square position relative to a pipe and independent from the pipe, thus facilitating welding the particular pipe fitting to the pipe.

2. A welding jig as defined in claim 1 including axle means rotatably connecting said second support plate to said first support plate.

3. A welding jig as defined in claim 2 wherein said first support plate includes a planar support surface, and wherein said segments are each spaced a predetermined distance from said axle means so that when a particular segment is selected, it is located a second predetermined distance from said planar support surface of said first support plate, said second predetermined distance being the distance required to support one end of a particular pipe fitting having a size corresponding to the particular segment while another end of the particular pipe fitting rests flat on the first support plate.

4. A welding jig as defined in claim 3 wherein said segments are positioned around the perimeter of said second support plate so that said second support plate has a center of gravity proximate said axle means.

5. A welding jig as defined in claim 4 wherein said segments are arcuately shaped.

6. A welding jig as defined in claim 5 including a locking means for holding said second support plate in a desired rotational position, said locking means being releasable to permit repositioning of said second support plate.

7. A welding jig as defined in claim 1 including a locking means for holding said second support plate in a desired rotational position, said locking means being releasable to permit repositioning of said second support plate.

8. A welding jig as defined in claim 7 wherein said locking means includes a plunger in one of said support plates and a series of apertures in the other of said support plates, said plunger being engageable with a selected one of said apertures to lock said second support plate in a particular orientation.

9. A welding jig as defined in claim 8 wherein said plunger is spring-biased into engagement with said apertures, but is manually movable out of engagement with said apertures to a release position.

10. A welding jig as defined in claim 1 wherein said segments are positioned around the perimeter of said second support plate and intersect one another so that said second support plate has a minimum weight and a center of gravity proximate said axle means so that said second support plate will not unstably rotate and injure an operator during adjustment of said second support plate.

11. A welding jig as defined in claim 10 wherein said segments are arcuately shaped.

12. A welding jig as defined in claim 1 wherein said second support plate includes an elongated rod-like handle extending parallel one side of said second support plate to facilitate rotating said second support plate.

13. A welding jig as defined in claim 1 including a first stand attached to said first support plate, said first stand being adjustable for supporting said first support plate at a desired height, and further including a second stand for separately supporting a pipe section proximate but spaced from said pipe fitting such that said pipe section and pipe fitting can be supported with a uniform gap therebetween, said uniform gap facilitating welding said pipe section and pipe fitting together with a leak-free and structurally sound weld of desired depth.

14. A welding jig as defined in claim 13 wherein said stand is a tripod.

15. A welding jig as defined in claim 1 including an adapter for said first support plate, said adapter including an angled surface positionable at a 45° angle to said first support plate so that a 45° pipe elbow can be positioned thereon with one end resting on a selected segment and the other end resting on the angle surface.

16. A welding jig comprising:
a first fixture including:
first means for supporting one end of a pipe fitting in a predetermined position relative to a pipe to which the pipe fitting is to be welded, second means for supporting the other end of the particular pipe fitting, said second means including a template having a perimeter shaped with segments adapted to support differently sized pipe fittings, said template being rotatable so that a selected segment can be positioned in a selected position relative to said first means to support the other end of the particular pipe fitting, and locking means for locking said template in the selected position; and
a second fixture configured to independently support said pipe in a position adjacent said pipe fitting so that a uniform gap is defined therebetween, whereby the particular pipe fitting can be positioned relative to a pipe in a particular orientation with respect to the pipe without contacting the pipe so that the pipe fitting can be welded to the pipe.

17. A welding jig as defined in claim 16 wherein said second means defines an axis of rotation as it is rotated relative to said first means, and wherein said segments are positioned around the perimeter of said template so as to create a center of gravity proximate said axis.

18. A welding jig as defined in claim 17 including an adapter for said first means, said adapter including an angled surface positionable at a 45° angle to said first means so that a 45° pipe elbow can be positioned with one end resting on a selected segment and the other end resting on the angled surface.

19. A welding jig as defined in claim 17 including a releasable locking means that can be actuated to release said second means for rotation, but which automatically relocks said second means in a selected position when not being actuated.

20. A welding jig comprising:
a planar first support plate;
a planar second support plate oriented perpendicularly to said first support plate and located proximate said first support plate with portions being disposed above and below said first support plate;
an axle disposed between said first and second support plate for rotatably mounting said first support plate to said second support plate;
a releasable locking member movably mounted on one of said first and second support plates and locating means located in the other of said first and second support plates, said locking member being movable between a release position disengaged from said locating means so that said second support plate can be rotated and a locking position engaged with said locating means so that said second support plate is fixed in a selected position;
said second support plate including a template-shaped perimeter including segments, each segment being adapted to support one end of a pipe fitting having a particular size while another end of the pipe fitting rests on said first support plate in a predetermined orientation, each segment being adapted to support a differently sized pipe fitting; and
a vertically adjustable support positioning said first support plate at a desired height.

21. A welding jig as defined in claim 21 wherein said segments are shaped to support one end of a 90° pipe elbow, whereby said first support plate can be positioned at a particular height relative to a pipe to which a selected 90° pipe elbow is to be welded to, and said second support plate can be selectively positioned relative to said first support plate to hold the selected 90° pipe elbow having a particular size in a desired orientation, thus allowing a single person to efficiently align and weld the selected 90° pipe elbow to a pipe.

* * * * *

UNITED STATES PATENT AND TRADEMARK OFFICE
CERTIFICATE OF CORRECTION

PATENT NO. : 5,312,096

DATED : May 17, 1994

INVENTOR(S) : Thomas E. Jasper

It is certified that error appears in the above-indentified patent and that said Letters Patent is hereby corrected as shown below:

Column 1, line 39;
      After "desired" insert --.--.

Column 3, line 23;
      After "industry" insert --.--.

Column 3, line 58;
      After "gravity" insert --.--.

Column 3, line 62;
      After "depth" insert --.--.

Column 4, line 23;
      After "herein" insert --.--.

Column 6, claim 18, line 19;
      "claim 17" should be --claim 16--.

Column 6, claim 19, line 26;
      "claim 17" should be --claim 16--.

UNITED STATES PATENT AND TRADEMARK OFFICE
CERTIFICATE OF CORRECTION

PATENT NO. : 5,312,096

DATED : May 17, 1994

INVENTOR(S) :

It is certified that error appears in the above-indentified patent and that said Letters Patent is hereby corrected as shown below:

```
Column 6, claim 21, line 58;
  "claim 21" should be --claim 20--.
```

Signed and Sealed this

Thirteenth Day of December, 1994

Attest:

BRUCE LEHMAN

Attesting Officer    Commissioner of Patents and Trademarks